(12) United States Patent
Pichkur (10) Patent No.: US 8,212,406 B2
(45) Date of Patent: Jul. 3, 2012

(54) SYSTEM, SOCKET AND PLUG APPARATUS FOR DC POWER DISTRIBUTION AND USAGE

(75) Inventor: Yaroslav Andreyevich Pichkur, Ridgewood, NY (US)

(73) Assignee: Yaroslav A. Pichkur, Ridgewood, NY (US)

( * ) Notice: Subject to any disclaimer, the term of this patent is extended or adjusted under 35 U.S.C. 154(b) by 518 days.

(21) Appl. No.: 12/317,608

(22) Filed: Dec. 26, 2008

(65) Prior Publication Data

US 2010/0164291 A1 Jul. 1, 2010

(51) Int. Cl.
*H02J 1/00* (2006.01)
*H02J 3/00* (2006.01)
(52) U.S. Cl. .......................................... 307/72
(58) Field of Classification Search .............. 307/72
See application file for complete search history.

(56) References Cited

U.S. PATENT DOCUMENTS

| | | |
|---|---|---|
| 3,414,806 A | 12/1968 | Carr |
| 5,164,652 A | 11/1992 | Johnson et al. |
| 5,264,958 A | 11/1993 | Johnson |
| 5,297,015 A | 3/1994 | Miyazaki et al. |
| 5,341,124 A | 8/1994 | Leyden et al. |
| 5,397,929 A | 3/1995 | Hogarth et al. |
| 5,535,274 A | 7/1996 | Braitberg et al. |
| 5,660,567 A | 8/1997 | Nierlich et al. |
| 5,783,926 A | 7/1998 | Moon et al. |
| 5,803,754 A | 9/1998 | Wilhelm |

(Continued)

FOREIGN PATENT DOCUMENTS

DE 1 615 003 3/1971

(Continued)

OTHER PUBLICATIONS

"Switched-mode power supply", Wikipedia.com, Jul. 9, 2008.

(Continued)

*Primary Examiner* — Rexford Barnie
*Assistant Examiner* — Dru Parries
(74) *Attorney, Agent, or Firm* — Tiajoloff and Kelly LLP (57) ABSTRACT

A power supply system comprises an electrical power generating device producing DC electrical power in the form of a DC electrical current, a DC current conductor receiving the DC electrical current from the electrical power generating device and carrying the DC electrical current to a socket, and an AC power system transmitting AC electrical current to the socket so that the socket can be accessed by a plug inserted therein to receive the DC current or the AC current from it. The socket has four recesses in it, and each recess has a respective contact therein. Each recess is configured to receive a respective prong and make a respective electrical contact with the plug therein. A first of the contacts transmits the DC current, a second and third of the contacts transmit complementary poles of the AC electrical current, and a fourth contact connects with a grounded connection. A DC-powered electrical device has a plug with a plug body and three prongs supported on and extending from the plug body. The prongs include two AC connection prongs and a ground connection prong corresponding to prongs of a standard three-prong plug. The plug further has a fourth prong supported on the plug body into the socket to contact the DC current recess. The fourth prong is removable from the plug body, or is movably supported on the plug body so that the fourth prong may be removed or moved so that the plug can be plugged into a standard three-recess AC socket.

20 Claims, 9 Drawing Sheets

U.S. PATENT DOCUMENTS

| | | |
|---|---|---|
| 5,818,197 A | 10/1998 | Miller et al. |
| 5,822,427 A | 10/1998 | Braitberg et al. |
| 5,836,785 A | 11/1998 | Lee |
| 5,901,056 A | 5/1999 | Hung |
| 6,057,610 A | 5/2000 | Nierescher |
| 6,061,261 A | 5/2000 | Chen et al. |
| 6,064,177 A | 5/2000 | Dixon |
| 6,172,891 B1 | 1/2001 | O'Neal et al. |
| 6,328,584 B1 | 12/2001 | Follett |
| 6,368,155 B1 | 4/2002 | Bassler et al. |
| 6,369,463 B1 | 4/2002 | Maiorano |
| 6,386,906 B1 | 5/2002 | Burke |
| 6,509,659 B1 | 1/2003 | Carroll et al. |
| 6,560,131 B1 | 5/2003 | vonBrethorst |
| 6,605,881 B2 | 8/2003 | Takehara et al. |
| 6,669,495 B2 | 12/2003 | Philips et al. |
| 6,690,277 B1 | 2/2004 | Hansen et al. |
| 6,698,597 B2 | 3/2004 | Marihugh |
| 6,761,579 B2 | 7/2004 | Fort et al. |
| 6,799,994 B2 | 10/2004 | Burke |
| 6,811,444 B2 | 11/2004 | Geyer |
| 6,845,023 B2 | 1/2005 | Philips et al. |
| 6,896,543 B2 | 5/2005 | Fort et al. |
| 7,015,596 B2 | 3/2006 | Pail |
| 7,134,887 B1 | 11/2006 | Keely |
| 7,140,922 B2 | 11/2006 | Luu et al. |
| 7,215,047 B2 | 5/2007 | Lilie |
| 7,285,874 B2 | 10/2007 | Menas et al. |
| 7,367,821 B2 | 5/2008 | Leslie et al. |
| 2001/0049222 A1 | 12/2001 | Fort et al. |
| 2002/0055288 A1 | 5/2002 | Philips et al. |
| 2002/0154243 A1 | 10/2002 | Fife et al. |
| 2002/0189842 A1 | 12/2002 | Burke |
| 2003/0036806 A1* | 2/2003 | Schienbein et al. ............... 700/1 |
| 2003/0211767 A1 | 11/2003 | Philips et al. |
| 2004/0066094 A1 | 4/2004 | Suzuki et al. |
| 2004/0229498 A1 | 11/2004 | Fort et al. |
| 2005/0102043 A1 | 5/2005 | Menas et al. |
| 2007/0121266 A1 | 5/2007 | Leslie et al. |
| 2008/0031026 A1 | 2/2008 | Menas et al. |
| 2009/0152947 A1* | 6/2009 | Wang ............................. 307/24 |
| 2011/0084555 A1 | 4/2011 | Pan |
| 2011/0089759 A1 | 4/2011 | Pan |

FOREIGN PATENT DOCUMENTS

| | | |
|---|---|---|
| EP | 0 944 148 A2 | 9/1999 |
| FR | 2 489 230 | 3/1982 |
| FR | 2 678 796 | 1/1993 |

OTHER PUBLICATIONS

Yaroslav Pichkur, "Proposal to establish new wiring standard in homes equipped with solar panels in order to eliminate power loss due to conversion between AC and DC".

* cited by examiner

SYSTEM, SOCKET AND PLUG APPARATUS FOR DC POWER DISTRIBUTION AND USAGE

FIELD OF THE INVENTION

This invention relates to systems for creating or supplying DC power, and to apparatus supplying DC power to electronic devices.

BACKGROUND OF THE INVENTION

Most systems for producing energy locally, such as by converting solar energy or wind energy to electricity, produce electrical power in the form of DC current at a voltage of, for example, 12 volts. This DC current output of the power generator is then converted to AC current and supplied to power the associated building via the standard AC electrical system of the building. Where there is no power usage in the building and there is an excess of generated DC power, the DC current may be used directly to charge a battery storing the power for future use. When power is need in the building this battery discharges, providing DC current, which is also converted to AC current and transmitted as AC current to the standard AC electrical system of the building.

As is well known, buildings in most of the world are supplied with electrical power in the form of AC current sent to sockets in the walls of buildings. These sockets are usually standard sockets for the given country. For example in the U.S., sockets are usually in the form of two parallel slots. One contact in the socket connects to one pole of an AC current supply and the other contact in the socket connects with a complementary pole of the AC current supply. These poles of the AC current usually referred to as the phase and the other the neutral.

AC power is obtained at the socket by plugging a standard two-prong plug into the socket. The two-prong plug has two rectangular AC connection prongs that are inserted into the two slots or recesses in the socket so as to make contact with springing metal contacts that supply AC current to those prongs. As a result, a circuit with flowing AC current is formed by a device electrically connected between the two prongs.

As is also well known, in addition to such a standard two-plug AC plug and socket arrangement, the socket may have a third recess or slot, usually circular in cross section, that receives a third cylindrical prong of a standard three-prong plug, and contacts this third prong and connects it to a grounded connection.

At the same time, more and more devices now rely on DC current for operation, including computers, computer speakers, lighting, televisions, cordless telephones, answering machines, video games, cordless tools, and many other devices that rely on a DC power source to operate. These devices normally derive power from a standard AC plug that takes AC current at the local voltage (in the U.S. 110 volts) and sends it through an AC/DC converter that converts to 110 v. AC current to a DC current at a voltage appropriate for the associated device. Presently about 6% of the U.S. power consumption is attributable to such low-power DC devices.

Where the device is used in a building with its own DC electrical power generation, the result is that the DC current from the solar or windmill or other generator is converted to DC current, with a consequent loss of 10 to 15% of total power to the conversion. A subsequent conversion of the AC to DC, depending on the type of transformer or converter used, results in an additional loss of 30 to 70% of the power of the AC. As a result, the use of a DC electrical device in a building powered by a DC generator such as a photoelectric panel system or a wind power generator is extremely inefficient relative to the solar or wind energy captured.

Transmission of both AC and DC power to the various sockets of the building is not readily possible because sockets as presently configured provide only two slots for AC power and possibly a third circular recess providing a ground connection. Changing this configuration is undesirable because many devices rely on AC current and have plugs configured to use the standard two- or three-prong sockets. Supplying DC power to the standard socket for use with a DC power device with a standard AC plug would potentially result in confusion and damage if a DC device were plugged in to an AC socket.

SUMMARY OF THE INVENTION

It is therefore an object of the present invention to provide an efficient system and method for powering DC-powered devices in a building wherein some or all of the power is generated locally as DC current, such as by solar or wind conversion.

It is further an object of the invention to provide for a wall socket in which both DC and AC power are provided without requiring use of special adaptors or plugs for access of the AC power.

It is further an object of the invention to provide a plug design for a DC-powered electronic device that can be used to access either DC power or AC power from a socket according to the invention, and can also access AC power from a standard two- or three-prong AC power socket and use that AC power to power the device.

According to an aspect of the invention, a power supply system comprises an electrical power generating device producing DC electrical power in the form of a DC electrical current, a DC current conductor receiving the DC electrical current from the electrical power generating device and carrying the DC electrical current to a socket, and an AC power system transmitting AC electrical current to the socket so that the socket can be accessed by a plug inserted therein to receive the DC current or the AC current from it. The socket has four recesses in it, and each recess has a respective contact therein. Each recess is configured to receive a respective prong and make a respective electrical contact with the plug therein. A first of the contacts transmits the DC current, a second and third of the contacts transmit complementary poles of the AC electrical current, and a fourth contact connects with a grounded connection.

According to another aspect of the invention, a wall socket supplying DC power and AC power in a building comprises a socket face having first and second recesses in it located in positions to receive prongs of a standard two-prong AC electrical plug. The socket has contacts in the recesses configured to electrically contact the prongs. The contacts each are electrically connected with a respective pole of the AC power so that an AC circuit is formed when a plug having prongs of the two-prong AC electrical plug is inserted in the socket. The socket has a third recess in it positioned to receive a ground prong of a standard three-prong AC electrical plug, and the recess has a contact therein connecting with ground. The socket has a fourth recess in it having a contact therein configured to engage a plug prong when inserted in it and to supply to the plug prong the DC power, such that a DC circuit is formed between the plug prong and a further prong contacting the grounded contact of the third recess.

According to still another aspect of the invention, an electrical device comprises a DC-powered electrical apparatus operable using DC current, and a plug operatively associated with the DC-powered electrical apparatus so as to supply DC current thereto. The plug has a plug body, and three prongs supported on and extending from the plug body. The prongs including two AC connection prongs and a ground connection prong corresponding to prongs of a standard three-prong plug. The plug further has a fourth prong supported on the plug body and extending from it adjacent the first three prongs. The fourth prong is removable from the plug body, or is movably supported on the plug body so that the fourth prong may be removed or moved so that the plug can be plugged into a standard three-recess AC socket.

Other objects and advantages of the invention will become apparent in the specification herein, and the scope of the invention will be set out in the claims.

DETAILED DESCRIPTION

Figure 1:
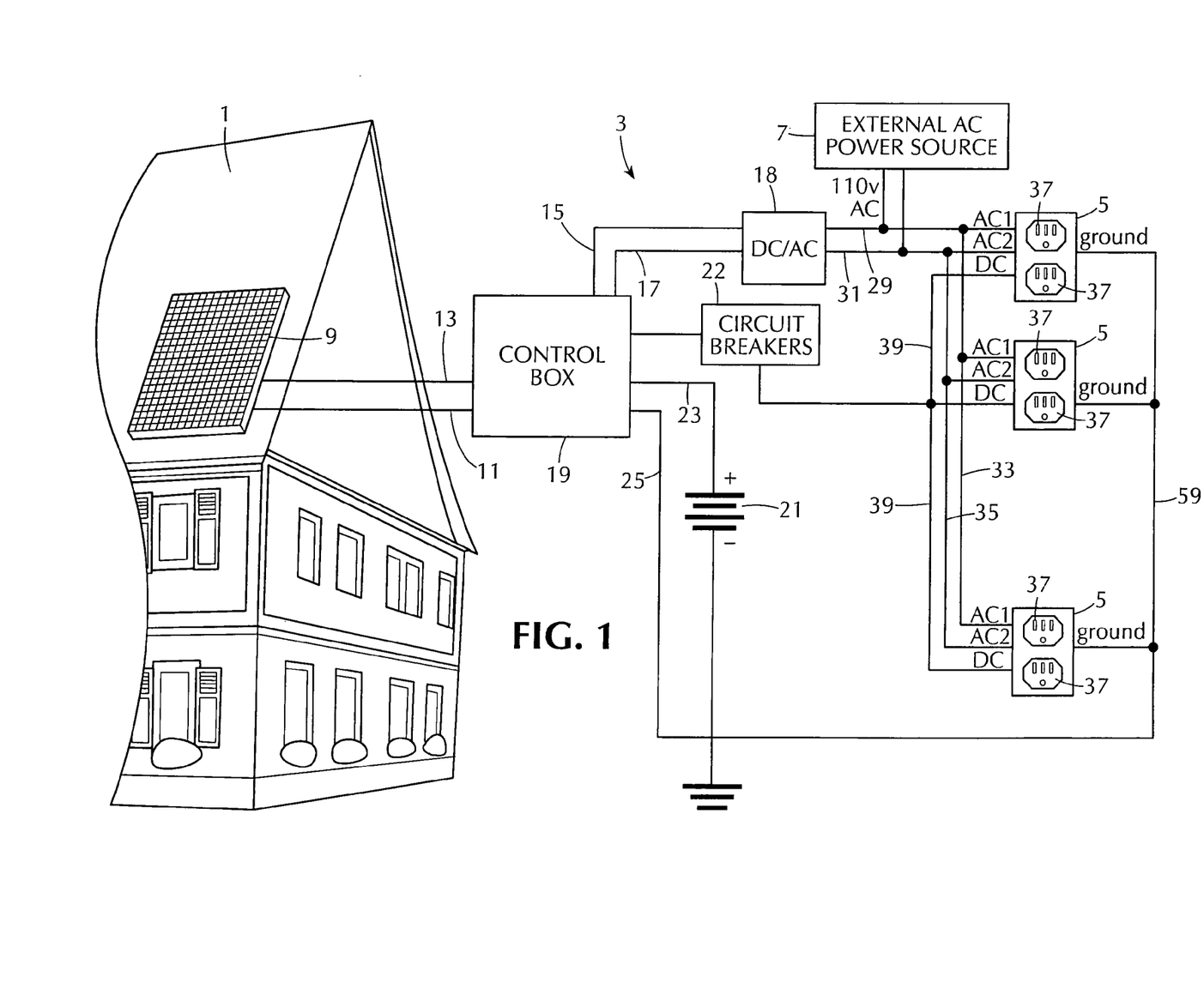
FIG. 1 is a schematic diagram of a building equipped with a power system according to a preferred embodiment of the invention.

Referring to FIG. 1, a building 1 is provided with a power supply system generally indicated at 3, providing electrical power to a plurality of wall sockets 5, distributed throughout the building 1.

Electrical power for the building is derived from one of two sources. One source is an external alternating current power source well known and generally used in the U.S., with AC current commonly coming from a utility that provides AC electrical power in the form of the usual U.S. 60 hertz alternating current at 110 volts. The other source 9 of electrical power is a local power generator at the building 1, which may be one of several types of devices, such as a solar panel or a wind-to-electrical power conversion windmill system (not shown), or another type of less usual source of power, such as tidal energy or geothermal energy.

The output of the local power generator 9 is normally 12 volt DC current transmitted along two positive and negative power lines 11 and 13. These lines of the DC power output by the generating device 9 are transmitted to a control circuit box 19 which contains a circuit that manages the usage of the locally generated DC power. This control box 19 transmits the electrical power in DC form to DC output lines 15 and 17 that transmit the electrical power to a DC-to-AC converter 18 that converts the DC current to 120 volt, 60 hertz AC, the AC current commonly used in U.S. alternating current power systems.

The power control circuit 19 also directs a portion of the DC power generated by the power generating device 9 to a battery 21 that is charged when the local power generating device 9 is producing electricity, as when a solar panel is receiving sunlight and converting it by a photoelectric effect into electricity. This battery is charged by the control circuit 19 so that it can discharge the accumulated power at times when the other generating device (9) is not active and is not producing electrical power, such as at night when a solar panel does not produce electricity. One line of the control circuit output 23 leads to one pole of a battery 21, which is charged as described above. The other output line 25 of the control circuit 19 connects to the other side of the battery 21 and to ground to create a closed circuit allowing charge of the battery 21. The power control circuit 19 is also configured to receive DC power from the battery 21 and to provide that DC power to the DC-to-AC converter 18 in those times when the local power generation device 9 is not producing DC power, to offset the AC power drawn from the local utility with stored locally generated energy.

When the DC power is converted to AC power, it results in two separate poles of AC current, herein referenced AC1, and AC2, transmitted along respective wiring lines 29 and 31. This AC power is normally that of a monophase alternating current system, and AC1 is the pole or line of AC referred to as the common or phase line, and AC2 is the line or pole referred to as "neutral". Connecting a device between AC1 and AC2 allows flow of AC current through the device to power it. The AC1 and AC2 currents are guided by lines 29 and 31 using standard AC building wiring 33 and 35, respectively, to supply both poles of the AC power to each of the sockets 37 of the various socket assemblies 5 throughout the building 1.

The control box 19 also transmits the positive side of the 12 volt DC power from the power generating device 9 (or from battery 21 when power is not being produced by device 9) directly to a further line running to circuit breakers 22 that transmit the DC power to a DC power distribution line 39 that distributes the DC power in the building, connecting to each of the sockets 37 of each of the socket assemblies 5 throughout the building 1. This is done a direct connection of the DC power source 9 or 21 to the line 39, without conversion of the DC power to AC power, as would be commonly the case in prior art solar power systems that waste a substantial fraction of the DC power generated.

The circuit breakers or fuses 22 interrupt the circuit of DC power supply to one or more of the sockets in the event that amperage exceeds a certain predetermined limit, e.g., 60 amperes. Circuit breakers or fuses are also preferably inserted in the AC power lines 29, 31, 33, or 35, as is commonly provided in an AC in a power system for any building.

Figure 2:
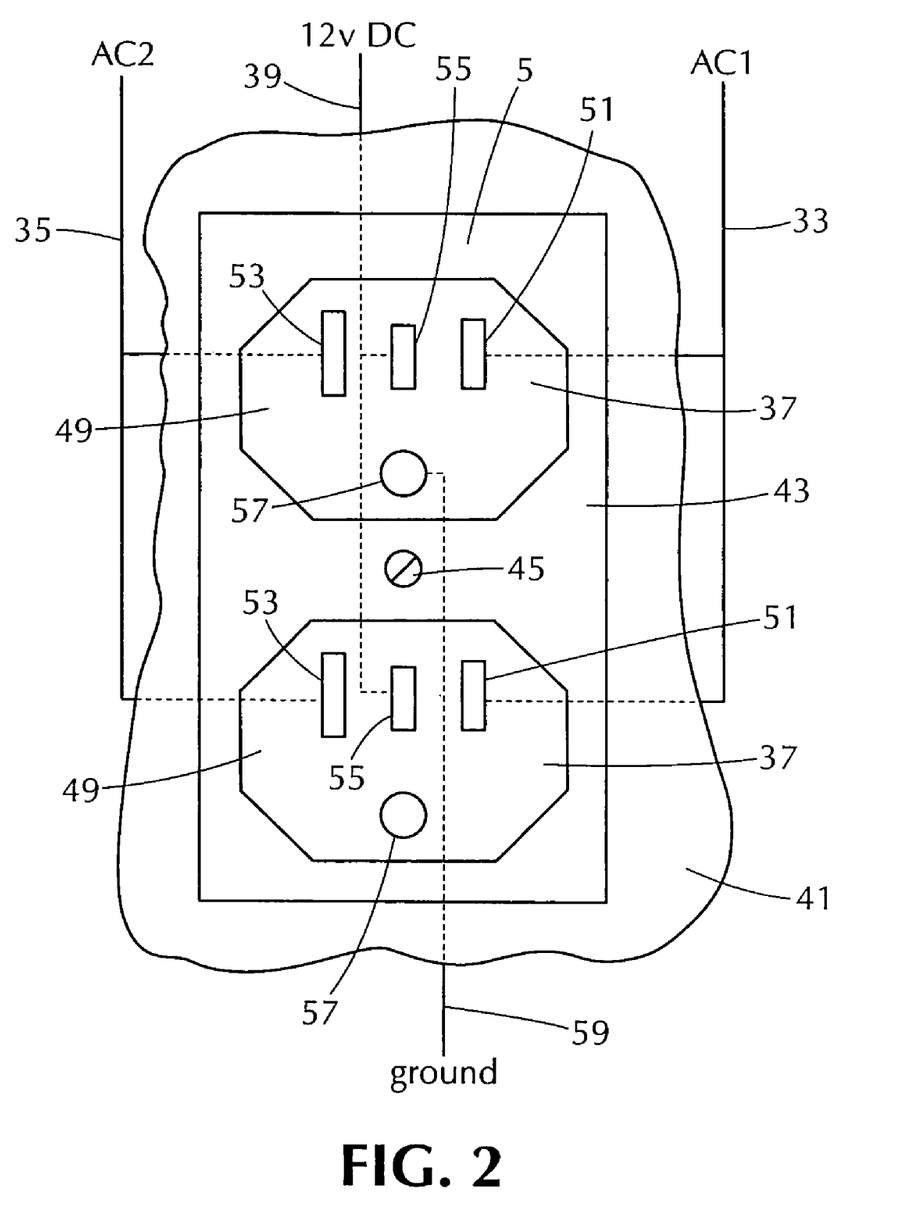
FIG. 2 is a detail view of a wall socket assembly according to a preferred embodiment of the invention.

As best seen in FIG. 2, the socket assemblies 5 are each supported within an aperture in a wall structure 41 of the building 1. The socket assembly 5 comprises two or potentially more or fewer sockets 37. The sockets 37 are supported within a standard socket box, not shown, and wiring is connected in the socket box to contacts in the various recesses of each socket 37, as is well known in the art. The sockets 37 themselves are supported in the behind a faceplate 43 secured to the wall by securement screw 45. Each of the sockets 37 has a usually octagonal face surface portion 47 that is an industry standard so that it will fit through standardized faceplates such as faceplate 43. The octagonal face shape and size are desirable to allow use of the sockets 37 with pre-existing faceplates, but the socket may be in any shape appropriate to the faceplate used, e.g., rectangular.

The plug 37 is configured to accommodate the prongs of a standard two-prong plug or a standard three-prong plug and to supply DC current to an additional prong not found in standard two- or three-prong plugs. For this, each of the sockets 37 is provided with elongated apertures or slots 51, 53 and 55 therein and a fourth slot or aperture 57, usually circular in shape. Slots 51 and 53 correspond to the standard sized slots for a two prong or three prong standard AC power plug. Slot 51 and slot 53 both have therein, as is commonly known in the art, metallic contact surfaces that are usually slightly biased inward to pinch on any blade-type prong inserted therein so as to form an electric contact with it. The contact in recess 51 is connected with line 33 which supplies to it the phase or common pole AC1 of the AC current, and slot 53 is connected with AC power line 35 which supplies AC2, a complementary AC pole or neutral side of the circuit. As is visible in FIG. 2, the neutral slot 53 is normally slightly longer than the phase or common slot 51 for polarized plugs, in which the neutral connection is a larger size prong. Recess 57 is configured to have inserted into it a third prong, generally cylindrical in shape. In the recess 57, the prong also makes an electric contact which is connected to a line 59, which is grounded or leads to ground.

The positions of these three recesses are standardized and well-known to almost all persons in the U.S. As a consequence of this design, when a standard two-prong AC plug is inserted into recesses 51 and 53 so as to engage the contacts therein, and this plug will derive AC power by bridging the lines between the AC1 phase current and the AC2 neutral side of the current, and can thus power any AC device attached thereto. Furthermore, the position of the aperture 57 is such that a standard three-prong plug may be inserted with two of its prongs or blades into recesses 51 and 53 and the standard cylindrical ground prong being inserted into recess 57 connecting with ground. This arrangement allows for AC operation deriving power by bridging the prongs in recesses 51 and 53, together with a connection to ground for shock prevention or other reasons.

In addition, according to the present invention, each socket 37 has a further recess 55 in it. Recess 55 has similar structure to that of recesses 51 and 53, in that it has a metallic material element or structure in it that is biased to pinch on a prong inserted into the recess 55 and to form an electric contact with that prong. The electrical contact in recess 55 is connected with the line 39 that supplies 12 volt DC current to each of the socket assemblies 5, and transmits that DC current to the prong in the recess 55.

Because 12 volt DC current is available at the recess 55 situated between recesses 51 and 53, it is possible to form a DC circuit by bridging the contact in recess 55 with ground in the ground contact 59 in recess 57 so that DC current flows between them, powering any DC circuit that is connected between them.

Figure 3A:
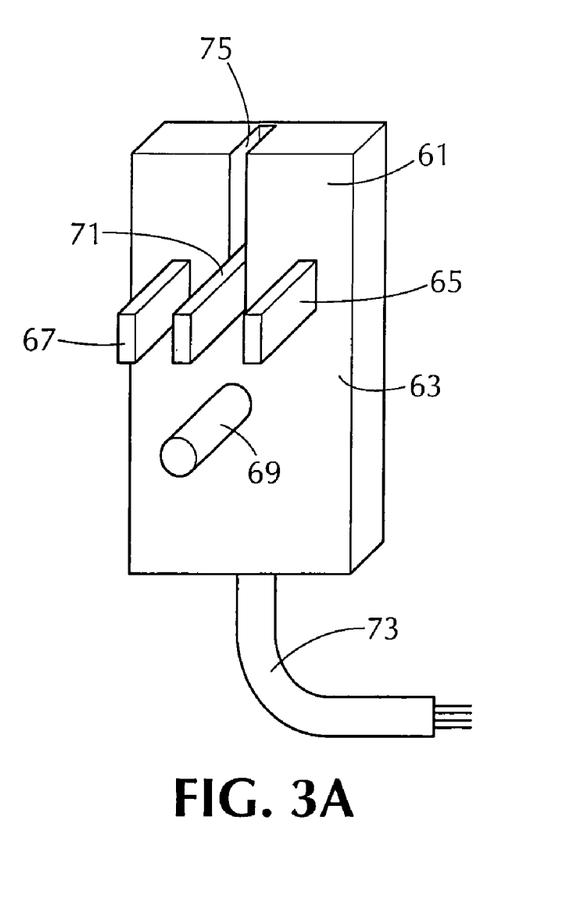
FIG. 3A is a perspective view of a plug apparatus for use in the power system of the invention.

FIG. 3A shows a plug structure suitable for use in the socket of FIG. 2. This plug structure comprises a plug body 61 having a face surface 63 from which project prongs for insertion into the corresponding socket 37. The prongs include prong 65 which is configured to enter into and form an electrical contact with the metallic element in recess 53 in such a socket as shown in FIG. 2 and prong 67 configured to enter and form an electrical contact with the element in recess 51 of socket 37. Cylindrical ground prong 69 is configured to be inserted into circular aperture 57 to form an electrical contact therein, with these three prongs being positioned and dimensioned according to the dimensions of a standard three-prong AC power plug.

Plug 61 also has a fourth prong 71 projecting outwardly from the front face 63 between prongs 65 and 67. Prong 71 is situated so as to extend into and form an electrical contact with a metallic contact element in slot 55 when prongs 65, 67, and 69 are fitted into the respective standard three-prong recesses 51, 53 and 57 in the socket 37. When the connections are made between all of the prongs, 65, 67 and 69 and their respective lines AC1, AC2, DC and ground, power is supplied by wire connector 73 to an associated electrical device, not shown, but which may be any electrical device that uses DC current.

Figure 3B:
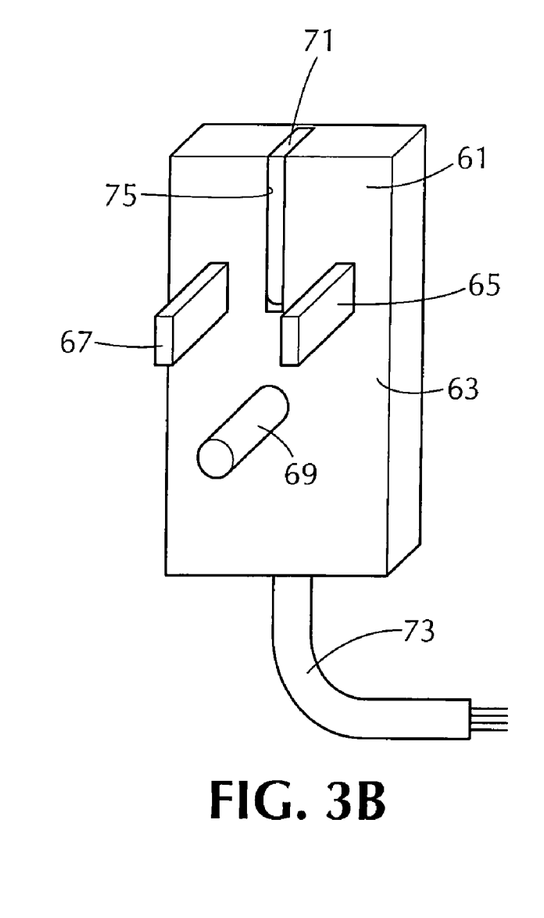
FIG. 3B is a view as in FIG. 3A wherein the middle prong is rotated out of the way for use of the plug in a standard socket.

Central prong 71 is supported on a pivot that allows the prong 71 to be rotated or pivoted between an extended position projecting from the front face 63 to a retracted position where it does not. The pivoting to the retracted position of the central prong 71 is shown in the comparison of FIG. 3A with FIG. 3B. As is seen in FIG. 3B, the prong 71 may be rotated so as to be completely within recess 75, so that the prong 71 is flush or recessed from the face 63 of the plug portion 61. When prong 71 is in this retracted position, the plug 61 can be inserted into a standard three prong plug for AC operation alone, because the prong 71 has been moved out of the way so that it does not interfere with the insertion of the other prongs 65, 67, 69 into the apertures of a standard three-prong socket.

Figure 4:
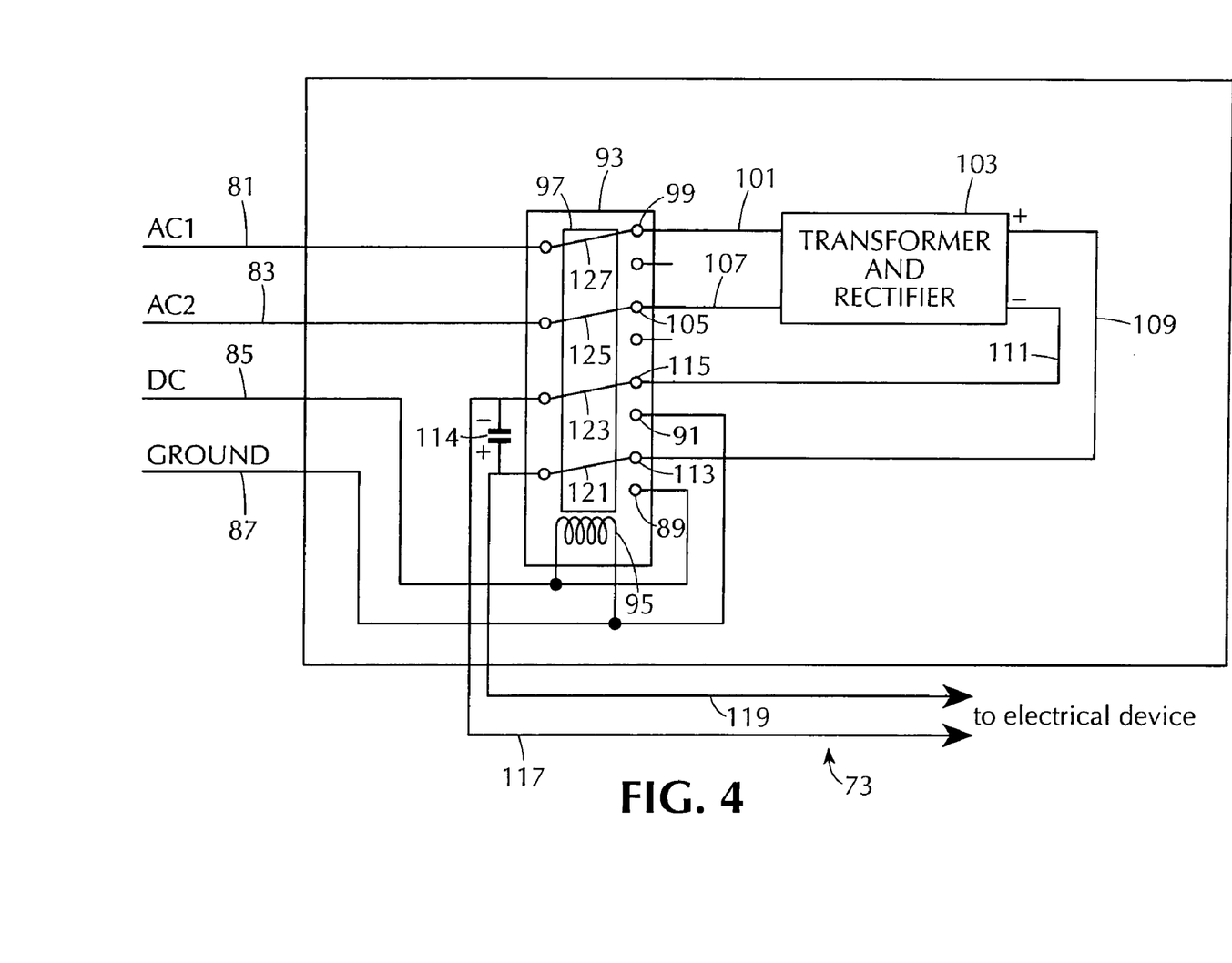
FIG. 4 is a schematic diagram of a power conditioning circuit for use with a plug as shown in FIGS. 3A and 3B in a condition when DC power is not present at the associated socket.

Referring to FIG. 4, a power conditioning circuit is shown that may be supported inside a housing of the plug body 61, or may be connected between power cord 73 and the electrical device associated with plug 61. The purpose of this power conditioner is to either transmit the DC power to the electrical device when DC power is available in the middle recess 55 of the socket the plug is plugged into, or to receive the AC power from the contacts in slots 51 and 53 and convert it to DC power that is supplied to the electronic device.

FIG. 4 shows a circuit of the preferred embodiment for providing power in this way. Each of the four prongs 65, 67, 69, 71 connects in the plug 61 to a respective wire 81, 83, 85 or 87. FIG. 4 shows a neutral position of the circuit, meaning the circuit condition that occurs when there is no DC electrical current applied at line 85.

Wires 85 and 87 carry the DC current and the ground connection respectively and extend around to connect to points 89 and 91 on switches in the multiple switch relay 93. The DC current, when present, passes through these lines and also through magnetic coil 95 bridging the two lines 89 and 91. This DC current magnetizes the coil, which causes the central switch member 97 to move away from its biased or default position, shown in FIG. 4, to a second switch position, seen in FIG. 5, where all four of the switches are changed to the opposing contact. On the other hand, if there is no DC current provided at the prong 71, such as in a case where an ordinary socket is being used that does not provide DC current, or when the DC power supply in the building 1 is for some reason not operating, then the magnetic coil 95 is not magnetized and the switches remain in the position they are biased to i.e. the position shown in FIG. 4.

In the condition of the circuit shown in FIG. 4, AC operation in the absence of DC current, the lead 85 going to the DC current source simply ends at pin 89. The AC1 (or phase) AC current flows through line 81 to relay switch point 99 and along conductor 101 to transformer and rectifier 103. The AC neutral current AC2 flows along line 83 to pin 105 and then along conductor 107 to the transformer and rectifier 103, which converts the 110 volt 60 hertz AC to DC output through lines 109 and 111 as the two poles of 12 volt DC current. These lines 111 and 109 connect with relay pins 113 and 115, and the DC current flows back across the relay switch 93 to electric device power lines 117 and 119 going to the DC electrical device connected with the plug 61. The electrical device in this scenario therefore is operating on transformed DC power derived from the AC current provided at the socket.

Figure 5:
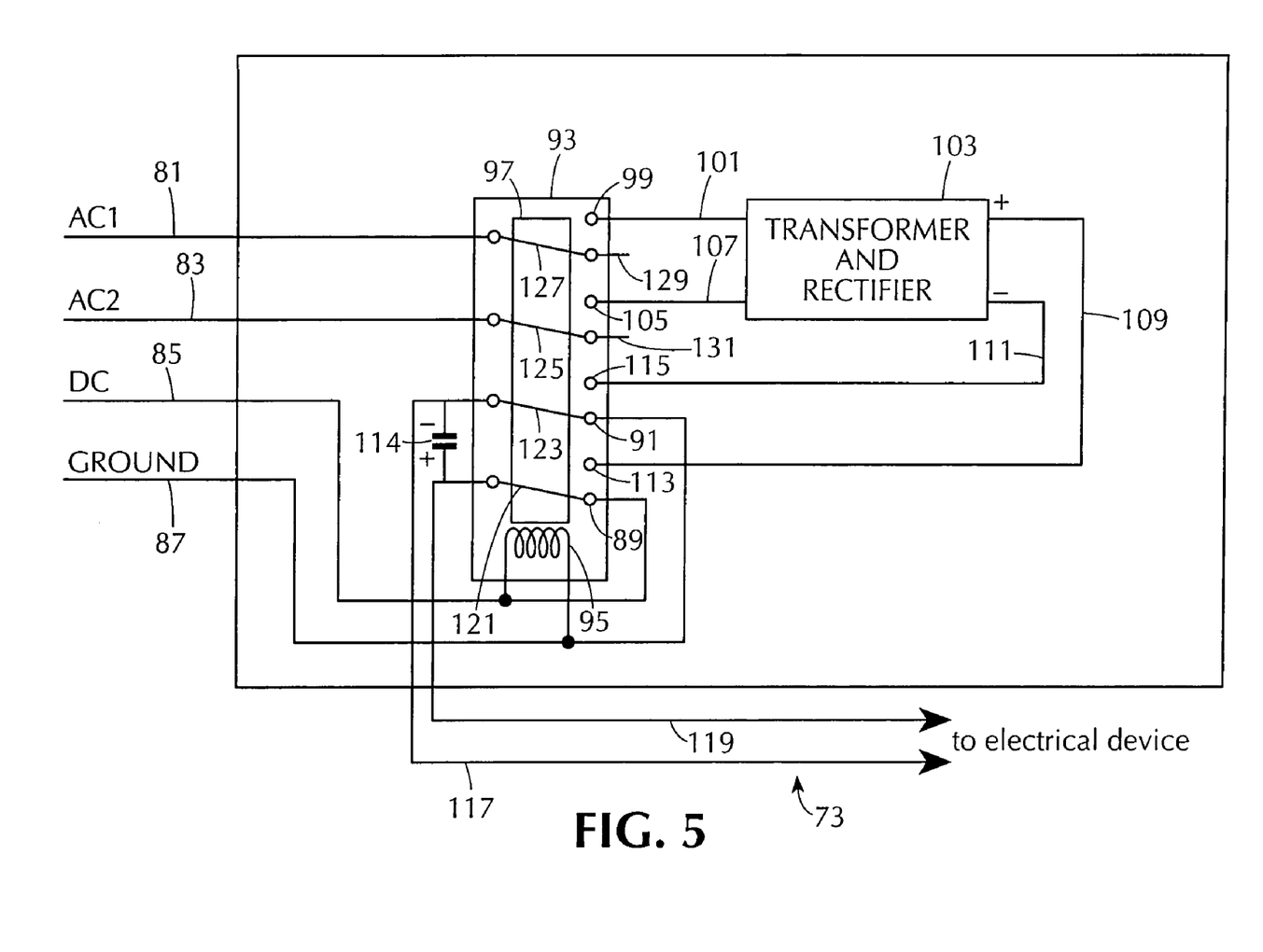
FIG. 5 is a view of the circuit of FIG. 4 in a condition when the DC current is available at the associated socket.

On the other hand, when DC current is provided the power conditioning circuit changes to the conditions shown in FIG. 5. The coil 95 is energized, causing member 97 to shift and to move the switches of relay 93 to the opposite switch positions. Specifically, the switch 121 connects with pin 89 and switch 123 connects with pin 91, and DC power flowing through line 85 from the DC prong of the plug 71 flows through switch 121 of the relay 93 and on to line 119 to the electrical device. Similarly, line 117 to the electrical device is connected via switch 123 to the contact point 91 and to the line 87 to ground. This results in a closed DC circuit such that the electrical device is powered by bridging the DC power and the ground connections supplied at the socket.

The DC current supplied to the electrical device is according to this design a 12 volt DC current. The manufacturer recommended voltage of a DC device can be potentially, less than this, e.g., 8 or 5 volts. Under most circumstances, even if the standard operating voltage is less than 12 volts, a voltage of 12 volts may be applied to the devices. However, if a reduced voltage is desired, an additional reduction in voltage can be made between the output of the output lines 117 and 119 and the electrical device attached thereto by any structure known in the art, such as a resistor, or a zener diode, a voltage regulator, etc.

If the plug is in the socket and there is a sudden loss or arrival of the DC current, the process of switching between AC and DC operation might result in an undesirable irregularity in voltage or a spike supplied along output lines 117 and 119. To avoid this, a capacitor 114 is connected between leads 117 and 119, so as to hold the voltage for a moment during switching between AC and DC.

In addition, the circuit may be coupled with a UPS (Uninterrupted Power Supply) to supply 12 volt DC power in the event of a full power loss. The UPS may be connected locally to the circuit or at the battery 21 of the power system.

Figure 6:
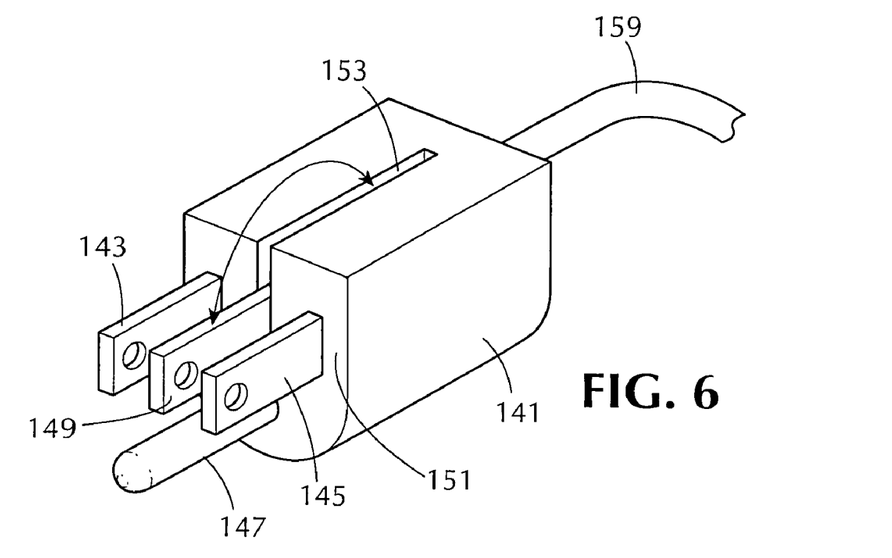
FIG. 6 is a perspective view of an alternate embodiment of plug for use in a system of the invention.

FIG. 6 shows an alternate embodiment of plug which may be used with the socket design of the preferred embodiment. This alternate embodiment plug 141 has four prongs that can be inserted into the corresponding recesses of the socket 37. Prongs 143 and 145 correspond to AC power connection prongs of a standard two-prong plug and prong 147 corresponds to the standard ground third prong of a standard three-prong plug. The middle prong 149 is configured to enter into the middle recess 55 of the socket 37 to contact the DC current supply therein.

When the plug 141 is to be used that does not provide this DC current recess 55, the prong 149 is supported pivotally so that the prong can rotate about a pivot point and be housed or can rotate into a position extending away from the front face 151 of the plug and to be contained within recess 153 in the plug body. This design improves the profile of the plug for crowded multiple socket fixtures.

Figure 7:
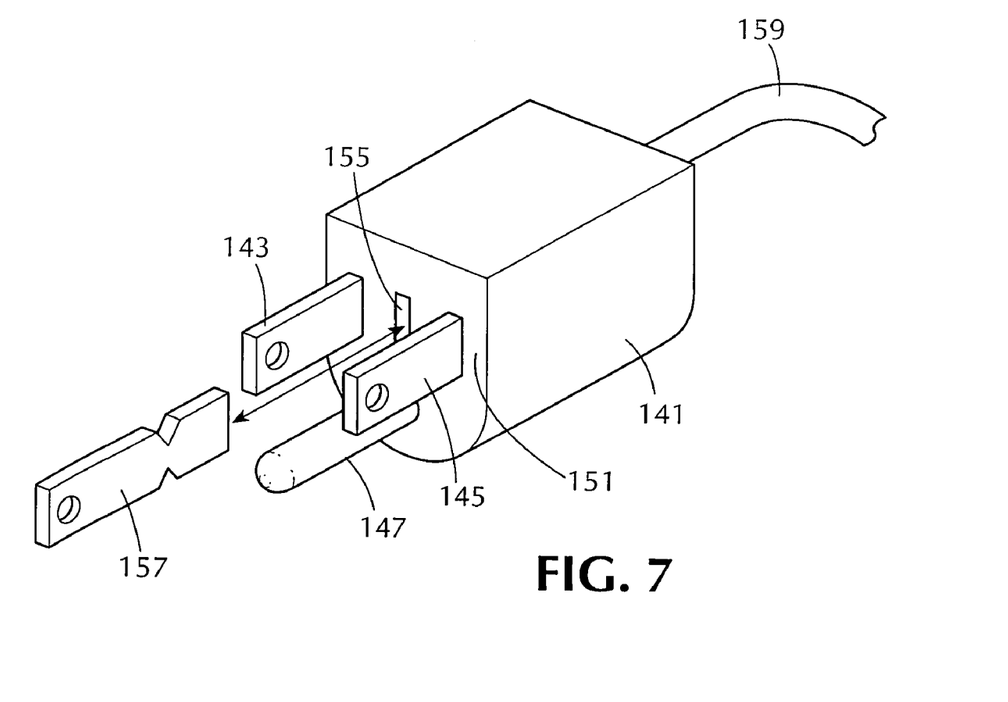
FIG. 7 is a perspective view of still another alternate embodiment of plug for use in a system of the invention.

FIG. 7 shows another alternate embodiment of plug wherein the reference numbers are the same as in the corresponding parts of FIG. 6. The plug body 141 supports the three prongs 143, 145 and 147 of a standard three-prong plug. In addition, the plug has a recess 155 therein that receives the center prong 157, which is removable by simply pulling it from the recess. When inserted in the recess, prong 157 makes an electrical contact with one of four wires that extend from the back of the plug body 141 to cord 159 which extends to the electrical device or to a power conditioning circuit as in FIGS. 4 and 5 that links to an electrical device.

Figure 8:
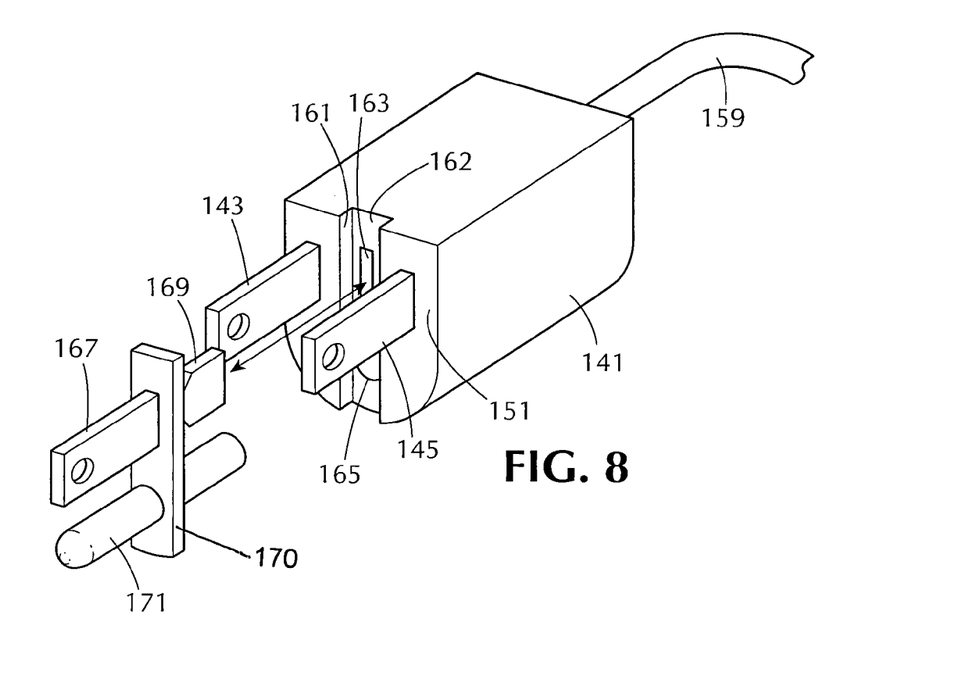
FIG. 8 is a perspective view of still another alternate embodiment of plug for use in a system of the invention.

FIG. 8 shows a further alternate embodiment of plug in which the plug body 141 supports prongs 143 and 145 in the usual position for a standard two-prong plug. The plug body 141 also has a recess 161 in forward facing surface 151. The recess 161 has a forward facing recessed or indented surface 162 parallel to the front face 151 of the plug. This inset face 162 has recesses 163 and 165, in which there are respective electrical contacts to receive a prong 169 inserted in recess 163 so as to connect with the DC conductor in cord 159, and a generally cylindrical prong 171 inserted in recess 165 so as to connect to a ground line in the electrical cord 159. The DC current prong 167 has a rearward portion 169 that is securingly received in the recess 163 and projects forward from the face 151 at an appropriate distance and in an appropriate distance to fit into the corresponding recess 55 in the socket to which the plug is inserted and make electrical contact. Similarly, prong 171 has a cylindrical shape and is securingly but releasably or removably inserted into recess 165 to secure an electrical contact with the ground wire in the cord 159 and once placed in the recess is held therein securely enough to use the plug in a socket 37 as well, wherein the prong 171 enters into and makes electrical contact in the ground connection opening 57. The two prongs 167 and 171 are carried in a support member 170, which keeps the prongs together and spaced appropriately for insertion into recesses 163 and 165. Support member 170 fits into recess 162 when the prongs 167 and 171 are inserted into the plug 141 so that the support member is flush with or at least does not extend forward of the front face 151 of the plug 141.

Figure 9:
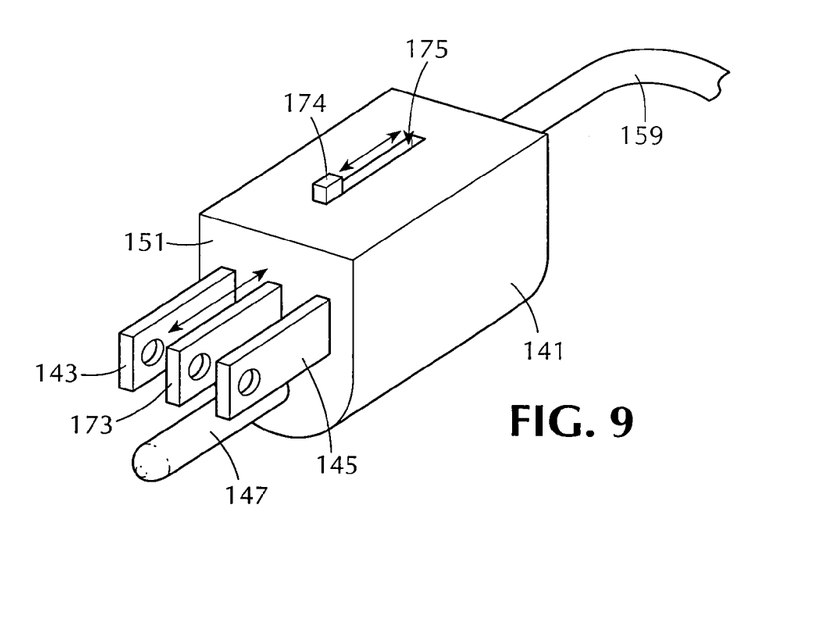
FIG. 9 is a perspective view of still another alternate embodiment of plug for use in a system of the invention.

FIG. 9 shows a further alternate embodiment where the plug body 141 supports prongs 143, 145 and 147 in the positions for a standard three-prong plug. A fourth prong, 173, is supported between prongs 143 and 145 for reciprocal sliding movement forward and rearward of the front face 151 of the plug body. The prong 173 is supported by a sliding structure in the plug body, and is connected with the raised thumb knob 174 of a manual slide generally indicated at 175. Knob 174 of the manual slide 175 can be moved toward the front face 151 of the plug, in which case the prong 173 projects forward so as to be configured to enter and access DC current in the socket 37 to be transmitted over cord 159, and it can also be drawn in the other direction, away from the front face 151, wherein the prong 173 is completely retracted to the level of the face 151, and the plug can be used with a standard three-prong AC socket that does not have the DC recess 55.

Figure 10:
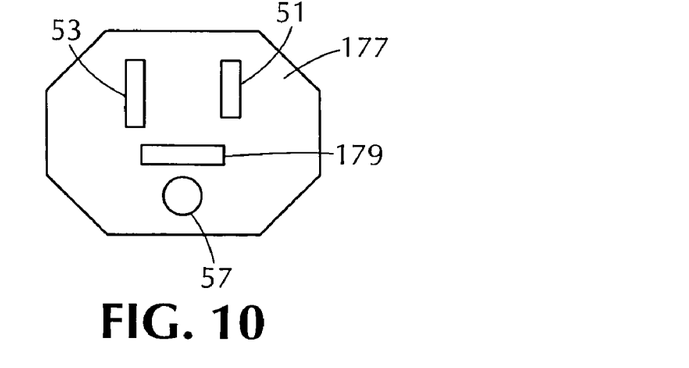
FIG. 10 is a front view of a socket according to an alternate embodiment of the invention.

FIG. 10 shows an alternate face socket design 177. The standard three-recess socket locations of the recesses for 51, 53, and 57 are provided in the face so that a standard AC three prong plug or a standard two prong AC plug can be inserted therein. In addition, socket face 177 also has a fourth recess 179 therein, which is located intermediate the two prong recesses 51 and 53 and the ground prong recess 57. Recess 179 has contacts therein that also connect with a DC current power source, e.g., line 39. The corresponding plug consequently has a DC current prong shaped and positioned to enter into the middle position where recess 179 is located.

Figure 11:
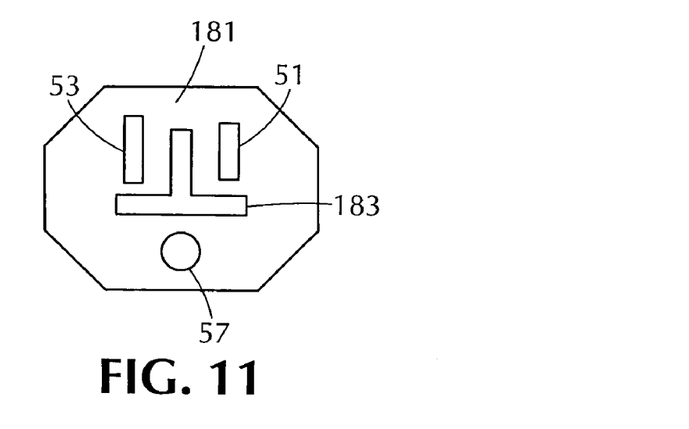
FIG. 11 is a front view of a socket according to another alternate embodiment of the invention.
Figure 12:
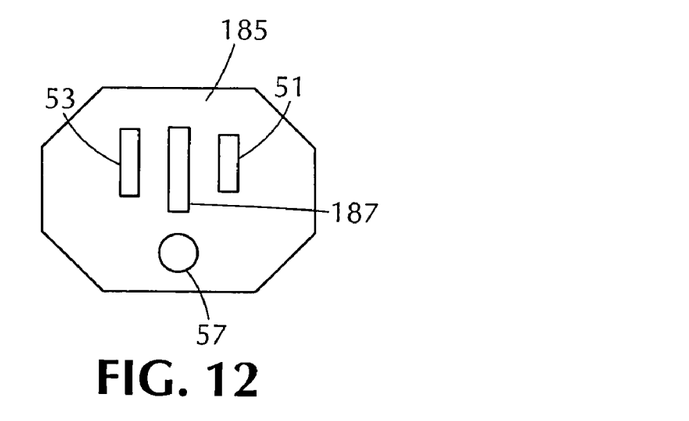
FIG. 12 is a front view of a socket according to still another alternate embodiment of the invention.

FIGS. 11 and 12 also show alternate embodiments of faces of sockets 181 and 185. The sockets have recesses therein for a standard three-prong plug, i.e. recesses 51, 53 and 57. The faces 181 and 185 are also provided with a differently configured opening for DC current access, these being T-shaped recess 183 and elongated recess 187. The corresponding prong of a plug accessing DC current from the contacts in this recess is configured in a similar shape, i.e. a T-shaped or a vertically longer blade prong, so as to engage electrical contacts in each of the corresponding recesses when inserted therein.

Figure 13:
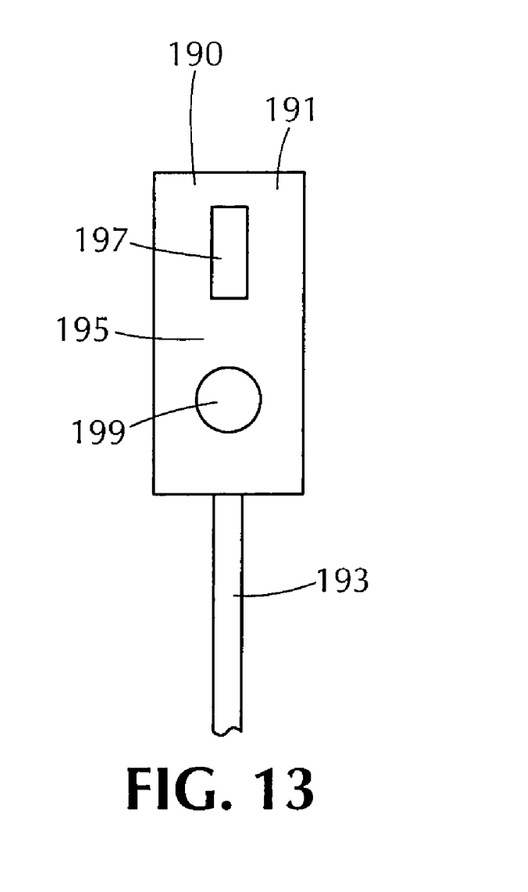
FIG. 13 is a front view of a plug for use to access only DC current form the socket of FIG. 2.
Figure 14:
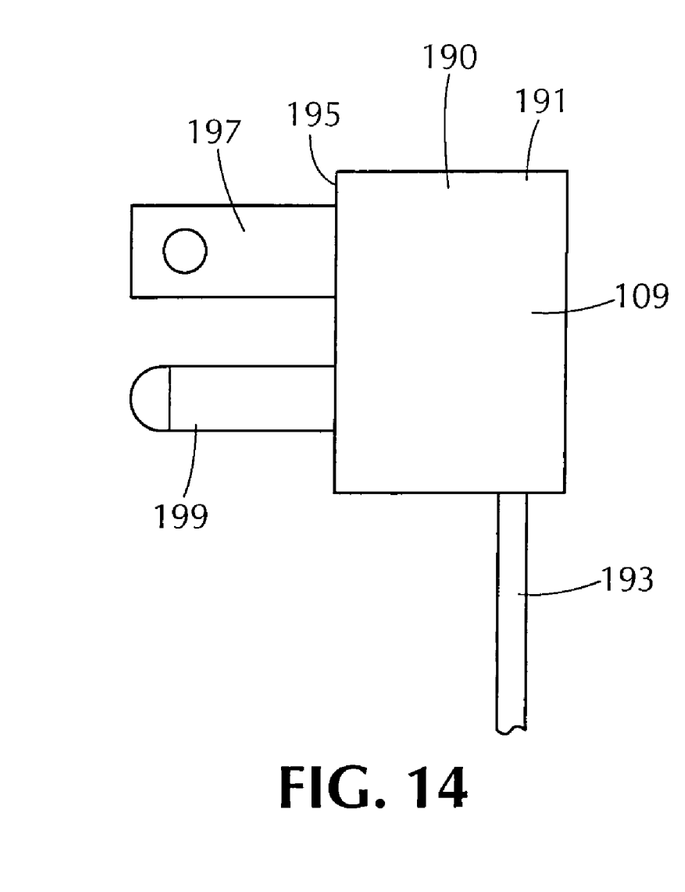
FIG. 14 is a side view of the plug of FIG. 13.

FIGS. 13 and 14 show a front and side view of a further alternate embodiment plug, which is provided for use with a socket such as shown in FIG. 2. This plug comprises a plug body 191 at the end of a cable 193 running to the electrical device. The plug 190 has two prongs extending forwardly from the face 195 of the plug. One prong 197 is configured to be received into recess 55 of socket 37, wherein this prong contacts the DC current supply wires. Prong 199 is configured to extend into the ground opening of 57 in socket 37 so as to make electrical contact with a contact that connects with ground. This type of plug 190 is usable to draw the DC current from the socket 37 without the need for a power conditioning circuit. Two wires run from this plug to the electrical device and carry DC current from the socket to the device when DC current is available. There is no transformer or rectifier required for this since there is no AC current connected with this particular plug.

This plug may also be used with an adaptor that is configured to receive the two prongs 197 and 199 and connect them at the other end to a male connector that can be inserted into and connected electrically with the female cigarette lighter socket of an automobile electrical system. Automobile electrical systems generally transmit 12 volt DC current, so operation is similar to that when inserted into a socket such as seen in FIG. 2, in which 12 volt DC current supplied.

Reference is made herein to "standard" socket design, which in the preferred embodiment has been the standard plug and socket design for U.S. and Canadian electrical systems. Where the system and method of this invention are used in different countries, the standard plug and socket can be the plug and socket design of that particular country or region, with the modification of the removable DC connection prong as appropriate. For instance, in European plugs and socket arrangements, which have two cylindrical prongs received in two circular recesses and a recess in the plug that receives a ground contact from the socket, a DC prong may be placed removably or movably on the European plug with a conforming recess such as recess 55 in the European style socket.

It will be understood that the invention herein extends well beyond the embodiments of the disclosure, and the terms used in this specification should be understood to be language of description, not limitation, as those of skill in the art with this specification before them will be able to make changes and modifications therein without departing from the scope of the invention.

What is claimed is:

1. A power supply system comprising:
    an electrical power generating device producing DC electrical power in the form of a DC electrical current;
    a DC current conductor receiving the DC electrical current from the electrical power generating device, said DC current conductor carrying said DC electrical current to a socket; and
    an AC power system transmitting AC electrical current to the socket so that said socket can be accessed by a plug inserted therein to receive therefrom the DC current or the AC current wherein the socket has four recesses therein, each recess having only one respective contact therein and being configured to receive a respective prong, and to make a respective electrical contact with said prong therein, a first of said contacts transmitting the DC current, a second and third of said contacts transmitting complementary poles of the AC electrical current, and a fourth contact connecting with a grounded connection; and
    wherein the recess with the contact providing the DC current supplies solely a single line of said DC current therein, such that a DC circuit may be formed between said single line of DC current and a prong asserted into the recess having the fourth contact.

2. The power supply system of claim 1, wherein said socket is configured to receive a first plug having a first prong configuration so as to supply to said first plug the DC current, and to receive a second plug having a second prong configuration so as to supply the AC current to said second plug.

3. The power supply system of claim 1, wherein the complementary poles are phase and neutral.

4. The power supply system of claim 1, wherein the recesses are positioned such that a standard two-prong AC plug when plugged into the socket engages the second and third contacts and creates an AC power circuit therewith.

5. The power supply system of claim 1, wherein the recesses are positioned such that a standard three-prong AC plug when plugged into the socket engages the second and third contacts and creates an AC power circuit therewith, and also contacts with the fourth contact connecting to ground.

6. The power supply system of claim 1, wherein the electrical power generating device comprises a solar panel deriving said electrical power from sunlight.

7. The power supply system of claim 1, wherein the electrical power generating device comprises a wind generator.

8. The power supply system of claim 1, wherein the system is installed in a building and the socket is supported in a wall structure of said building.

9. The power supply system of claim 1, a battery is connected with the electrical power generating device so that the battery receives a charge when the electrical power generating device is producing said DC current, and such that, when the electrical power generating device is not producing said DC current, the battery discharges a battery DC current to the DC current conductor, which transmits the battery DC current to the socket.

10. The power supply system of claim 1, wherein the AC current is derived at least in part from a portion of the DC current that is converted to AC and supplied to the AC power system.

11. The power supply system of claim 1, wherein an electrical device having a device plug is plugged into said socket, said device plug including a first prong inserted in and engaging the contact in the first recess and a second prong inserted in and engaging the grounded contact, said electrical device deriving DC power from a circuit formed therebetween.

12. A power supply system comprising:
    an electrical power generating device producing DC electrical power in the form of a DC electrical current;
    a DC current conductor receiving the DC electrical current from the electrical power generating device, said DC current conductor carrying said DC electrical current to a socket; and
    an AC power system transmitting AC electrical current to the socket so that said socket can be accessed by a plug inserted therein to receive therefrom the DC current or the AC current wherein the socket has four recesses therein, each recess having a respective contact therein and being configured to receive a respective prong, and to make a respective electrical contact with said plug therein, a first of said contacts transmitting the DC current, a second and third of said contacts transmitting complementary poles of the AC electrical current, and a fourth contact connecting with a grounded connection; wherein the recesses are positioned such that a standard three-prong AC plug when plugged into the socket engages the second and third contacts and creates an AC power circuit therewith, and also contacts with the fourth contact connecting to ground; and wherein the recess of the first contact is located between the recesses of the second and third contacts.

13. A power supply system comprising:
an electrical power generating device producing DC electrical power in the form of a DC electrical current;
a DC current conductor receiving the DC electrical current from the electrical power generating device, said DC current conductor carrying said DC electrical current to a socket; and
an AC power system transmitting AC electrical current to the socket so that said socket can be accessed by a plug inserted therein to receive therefrom the DC current or the AC current wherein the socket has four recesses therein, each recess having a respective contact therein and being configured to receive a respective prong, and to make a respective electrical contact with said plug therein, a first of said contacts transmitting the DC current, a second and third of said contacts transmitting complementary poles of the AC electrical current, and a fourth contact connecting with a grounded connection;
wherein an electrical device having a device plug is plugged into said socket, said device plug including a first prong inserted in and engaging the contact in the first recess and a second prong inserted in and engaging the grounded contact, said electrical device deriving DC power from a circuit formed therebetween; and
wherein the device plug further comprises at least two AC prongs corresponding to prongs of a standard two-prong AC plug, and device plug being connected with the electrical device via a power processing circuit, said power processing circuit providing DC current from the first prong and the first contact to the electrical device when said DC current is present at said first contact, and converting the AC current from said AC prongs to a local DC current and supplying said local DC current to the electrical device when the DC current is not present at said first contact.

14. A wall socket supplying DC power and AC power in a building, said wall socket comprising:
a socket face having first and second recesses therein located in positions to receive prongs of a standard two-prong AC electrical plug;
the socket having contacts in said recesses configured to electrically contact said prongs, said contacts each being electrically connected with a respective pole of said AC power so that an AC circuit is formed when a plug having prongs of said two-prong AC electrical plug is inserted in the socket;
said socket having a third recess therein positioned to receive a ground prong of a standard three-prong AC electrical plug, said recess having a contact therein connecting with ground; and
said socket having a fourth recess therein having a contact therein configured to engage a plug prong when inserted therein and to supply to said plug prong the DC power, said fourth recess supplying only a single line of DC current in the DC power, such that a DC circuit is formed between said plug prong and a further prong in the third recess contacting the grounded contact of said third recess.

15. A wall socket supplying DC power and AC power in a building, said wall socket comprising:
a socket face having first and second recesses therein located in positions to receive prongs of a standard two-prong AC electrical plug;
the socket having contacts in said recesses configured to electrically contact said prongs, said contacts each being electrically connected with a respective pole of said AC power so that an AC circuit is formed when a plug having prongs of said two-prong AC electrical plug is inserted in the socket;
said socket having a third recess therein positioned to receive a ground prong of a standard three-prong AC electrical plug, said recess having a contact therein connecting with ground; and
said socket having a fourth recess therein having a contact therein configured to engage a plug prong when inserted therein and to supply to said plug prong the DC power, such that a DC circuit is formed between said plug prong and a further prong contacting the grounded contact of said third recess; and
wherein the fourth recess is located between the first and second recesses.

16. An electrical device comprising:
a DC-powered electrical apparatus operable using DC current; and
a plug operatively associated with the DC-powered electrical apparatus so as to supply DC current thereto;
said plug having a plug body; and
said plug having three prongs supported on and extending from the plug body, said prongs including two AC connection prongs and a ground connection prong corresponding to prongs of a standard three-prong plug;
said plug further having a fourth prong supported on the plug body and extending therefrom adjacent the three prongs; and
said fourth prong being removable from the plug body, or being movably supported on the plug body so that said fourth prong may be removed or moved so that the plug can be plugged into a standard three-recess AC socket.

17. The electrical device according to claim 16, wherein said fourth prong is supported so as to be moved between a first position, wherein said fourth prong can be received in a four-slot socket with the three prongs, and a second position, wherein said fourth prong does not interfere with insertion of the three prongs into a standard three-recess grounded AC socket.

18. The electrical device according to claim 17, wherein said fourth prong is pivotally supported so as to rotate about a pivot between the first and second positions.

19. The electrical device according to claim 16, wherein said fourth prong is between the AC connection prongs of the plug.

20. The electrical device according to claim 16, wherein a power conditioner is connected between the plug and the electrical apparatus, said power conditioner being electrically connected with the four prongs of the plug and receiving AC current from the AC connection prongs,
when the fourth prong is receiving DC current, said power conditioner converting the AC current to DC current and supplying said DC current to the electrical apparatus, and
when the fourth prong is receiving DC current, said power conditioner supplying said DC current from the fourth prong to the electrical apparatus.

* * * * *